Dec. 20, 1938.   J. G. KEMPTGEN   2,141,109
FILM REEL BAND
Filed Dec. 8, 1937
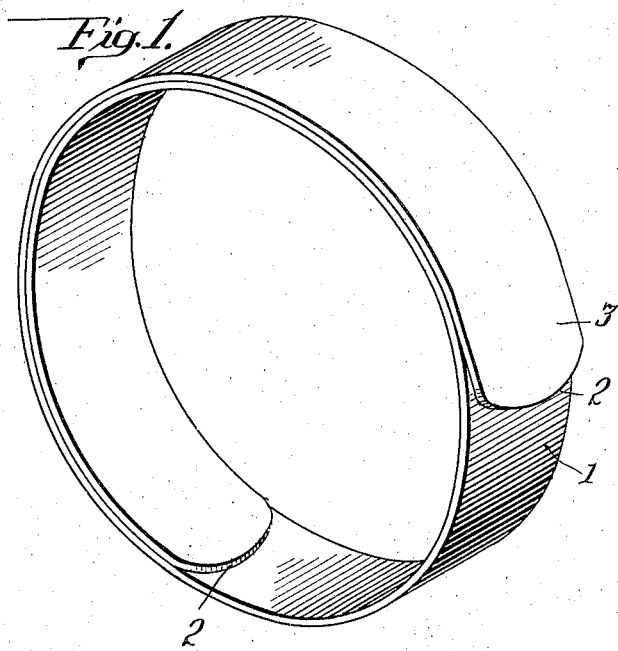
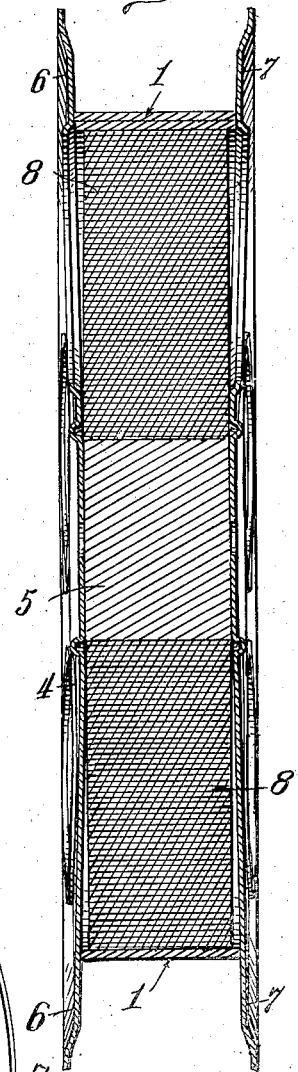
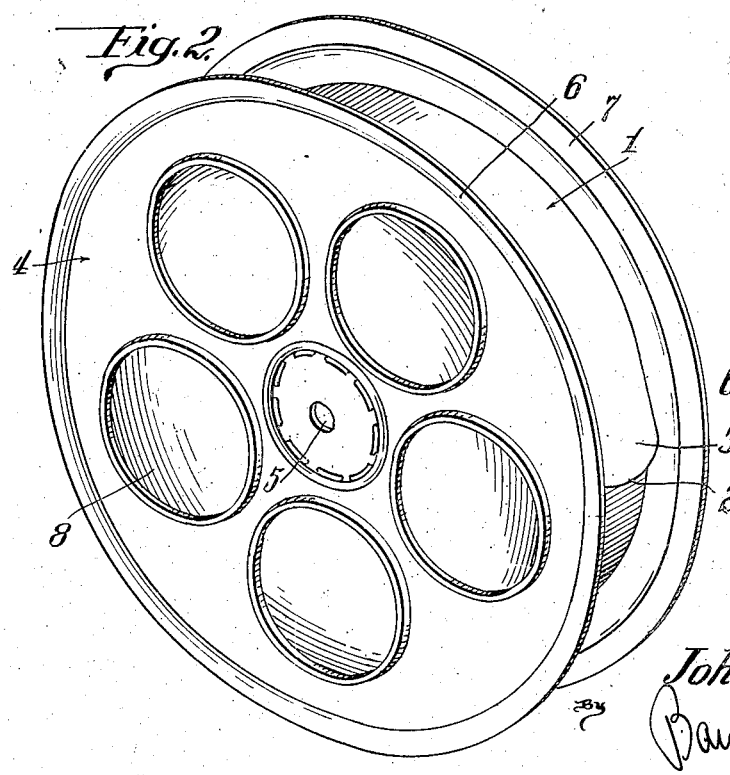
Inventor
John G. Kemptgen
By
Barnett + Truman
Attorneys Patented Dec. 20, 1938

2,141,109

UNITED STATES PATENT OFFICE 2,141,109

FILM REEL BAND

John G. Kemptgen, Chicago, Ill.

Application December 8, 1937, Serial No. 178,759

5 Claims. (Cl. 206—53)

This invention is directed to new and useful improvements in film reel bands adapted to be positioned around motion picture film that is wound on a reel so as to provide a support and protection for the reel and also encase the film.

As is well known in the industry, motion picture films for use in projection machines are usually mounted or wound on reels having capacities of one thousand feet and lately in some cases two thousand feet. These reels are in continuous use, being transported from film distributors to motion picture theaters and returned, handled by the projection machine operators, and sorted and stored by the distributors. The reels are of light metal construction and the flanges of the reel between which the film is wound are supported only by the hub of the reel so that the outer edges of the flanges are very susceptible to damage. In the use of these reels as above pointed out, quite frequently the flanges are bent or dented, not only damaging the reel itself but injuring the film on the reel and preventing the free flow of the film to the projection machine when in use and thus causing further wear and injury to the film. The damage thus caused to reels is very great and the replacement and repair cost to film distributors is substantial.

Many different structures have been provided for preventing the film from unwinding from the reel and for protecting the film when not in use but nothing has been provided for protecting the reel. Applicant is familiar with structures such as paper and cardboard bands and spring metal bands of the same width as the film adapted to be sprung around the film for its protection but such devices do not provide a solution to the problem of reel damage for they do not provide support for the reel flanges.

The primary purpose of this invention is to provide a spring metal band of greater width than the distance between the flanges of a motion picture film reel which is adapted to be sprung around film mounted on the reel and slightly spread the flanges of the reel to give positive support and protection for the reel itself, as well as adequately protecting the film from damage.

Further objects are to provide such a band that is simple in construction, will not damage the film or reel when it is applied and may easily be sealed against unauthorized use in accordance with the usual practice.

Still a further object is to provide a film reel band of long life that need not in the ordinary usage ever be replaced.

Another object is to provide a band that will take much of the strain away from the hub of the reel and thus increase the life of the reel.

Further objects and advantages will be apparent from examination of the following detailed description and drawing.

Fig. 1 is a perspective view of a band embodying the invention in natural contracted position.

Fig. 2 is a perspective view of a reel and film with the band in operative position.

Fig. 3 is a vertical cross-sectional view of the reel, film and band shown in Fig. 2.

In detail the spring metal band is shown at 1 having its ends rounded, as shown at 2, with the outer end for a relatively short distance formed with substantially less curvature, as indicated at 3. The inner surface of the band is smooth and all edges have been rounded to eliminate sharp or ragged portions that might injure the film.

To completely understand the invention an example of the relative dimensions of the various elements will be given. The standard, or 35 millimeter motion picture film, is $1\frac{3}{8}$ inches wide, the inside distance between the flanges of the standard reel for such film is $1\frac{7}{16}$ inches and the preferred width of the metal band, the subject of this invention, is $1\frac{9}{16}$ inches. It is thus apparent that that portion of the reel within which the film is wound is $\frac{1}{16}$ inch wider than the film and the band $\frac{3}{16}$ inch wider than the film.

The reel 4 has a hub 5 and flanges 6 and 7 and carries the film 8.

The band 1 is constructed of spring steel of about 12 gauge and is of a length sufficient to be placed around a full reel of the desired size and overlap itself sufficiently so as to be sealed. Its curvature is such that in its natural position its respective ends will lie substantially opposite each other, as shown in Fig. 1 of the drawing.

It is obvious that bands embodying this invention may be constructed for use with any size film or reel. The only measurements that must be noted are that the width of the band is slightly greater than the distance between the flanges of the reel, the length is sufficient to exceed by a comfortable margin the circumference of the film on a full reel and the natural curvature is such that in contracted position it will adequately bear against film that only utilizes about three quarters of the capacity of the reel.

In applying the band to the reel it is placed around the film between the flanges of the reel, the flanges being forced away from each other slightly to accommodate the band which, as has been pointed out, is slightly wider than the distance between the flanges. The natural contraction of the spring band causes it to snugly fit against the outer surface of the film and its greater width spreads the flanges to positively support the flanges against any blow which otherwise would bend or dent them. Thus also the film is enclosed in a metal casing for the inside surfaces of the flanges press against the edges of the band. This is all shown very clearly in Fig. 3 of the drawing.

Because of the fact that the outer end of the band is of less curvature than the rest, it will tend to lie snugly against the band that it overlaps, thus facilitating the sealing of the band.

It can be clearly seen that this improved band construction when applied to a reel on which is wound film forms a steel brace between the outer edges of the flanges of the reel which adequately protects the reel and film from injury. By thus positively supporting the flanges near the outer edge of the reel, much strain which has heretofore been taken by the hub of the reel is transferred to the steel band and the tendency of the hub to come loose from the reel is greatly lessened, thus greatly increasing the life of the reel.

As has been heretofore pointed out, this new and useful film reel band is adapted for use with reels and films of any size whatsoever. The gauge of the spring metal used should be such that the band will withstand, without buckling, the usual lateral blows and forces to which reels are usually subjected and will permit easy application of the band to the reel. The length of the band is determined by the size of the reel to which it is intended to be applied, the width is slightly greater than the distance between the flanges of the reel and the natural curvature or contracted position is such as will automatically cause the band to snugly encase film on a reel when only utilizing about three-quarters of the full capacity of the reel. All of this will be readily apparent to persons familiar with the art.

Merely as indicative of the above and without in any way limiting this invention, the following dimensions are suggested for a band to be used on a reel adapted to receive one thousand feet of 35 millimeter film.

| | |
|---|---|
| Gauge of spring steel | 12 |
| Length of band inches | 32 |
| Width of band do | 1 9/16 |
| Diameter of circle formed by band in natural contraction do | 7 |
| Diameter of circle formed by band in maximum expansion do | 10 |

I claim:

1. A band, adapted to encircle the film carried by a reel, having a width greater than the distance between the flanges of the reel so as to slightly spread the flanges when positioned around the film to form a positive support for the flanges.

2. A spring metal band, curved so as to automatically lock itself around the film carried by a reel, having a width slightly greater than the distance between the flanges of the reel, and having the outer end of less curvature than the rest of the band.

3. The combination comprising a reel having flanges, film wound on said reel, a band positioned against and around the film between the flanges of the reel and having a greater width than the normal distance between the flanges and therefore slightly spreading the flanges to form a continuous brace between the flanges adjacent the outer portions.

4. The combination comprising a reel having flanges, film wound on said reel, a flat spring metal band of greater width than the normal distance between the flanges of the reel, encircling said film and spreading the flanges apart to form a continuous brace supporting both flanges adjacent the edge of the film.

5. The combination comprising a reel having flanges, film wound on said reel, a flat spring metal band with rounded edges having an outer end of less curvature than the rest of the band and a width greater than the normal distance between the flanges of the reel, said band positioned against and around the film and between the flanges to spread them slightly and said outer end overlapping the inner end of the band and in position for sealing.

JOHN G. KEMPTGEN.